(12) United States Patent
Mameli et al.

(10) Patent No.: US 11,014,725 B2
(45) Date of Patent: May 25, 2021

(54) PACKAGING MATERIAL, AND PROCESS OF MANUFACTURING THE SAME

(71) Applicant: Tetra Laval Holdings & Finance S.A., Pully (CH)

(72) Inventors: Alberto Mameli, Modena (IT); Seppo Bergman; Gabor Benkö, Lund (SE); Rolf Lasson, Lomma (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 220 days.

(21) Appl. No.: 16/077,285

(22) PCT Filed: Feb. 8, 2017

(86) PCT No.: PCT/EP2017/052781
§ 371 (c)(1),
(2) Date: Aug. 10, 2018

(87) PCT Pub. No.: WO2017/137452
PCT Pub. Date: Aug. 17, 2017

(65) Prior Publication Data
US 2019/0039795 A1    Feb. 7, 2019

(30) Foreign Application Priority Data
Feb. 12, 2016 (SE) .................................. 1650190-0

(51) Int. Cl.
| | |
|---|---|
| *B32B 3/24* | (2006.01) |
| *B65D 65/40* | (2006.01) |
| *B32B 27/10* | (2006.01) |
| *B32B 3/26* | (2006.01) |
| *B65D 5/74* | (2006.01) |

(Continued)

(52) U.S. Cl.
CPC .............. *B65D 65/40* (2013.01); *B32B 3/263* (2013.01); *B32B 3/266* (2013.01); *B32B 7/12* (2013.01); *B32B 15/085* (2013.01); *B32B 15/12* (2013.01); *B32B 15/20* (2013.01); *B32B 27/08* (2013.01); *B32B 27/10* (2013.01); *B32B 27/32* (2013.01); *B65D 5/746* (2013.01); *B31B 50/14* (2017.08); *B31B 50/84* (2017.08); *B32B 2038/042* (2013.01); *B32B 2038/047* (2013.01);

(Continued)

(58) Field of Classification Search
CPC ......................... B32B 3/266; B32B 2038/042
USPC ........................ 83/30, 21; 428/137, 156, 157
See application file for complete search history.

(56) References Cited

U.S. PATENT DOCUMENTS

| | | | |
|---|---|---|---|
| 3,525,454 A | 8/1970 | Frederiksen | |
| 4,266,993 A * | 5/1981 | Olsen | B29C 66/032 156/69 |

(Continued)

OTHER PUBLICATIONS

Office Action for Swedish Application No. 1650190-0 dated Sep. 5, 2016 in 6 pages.

(Continued)

*Primary Examiner* — William P Watkins, III
(74) *Attorney, Agent, or Firm* — Knobbe, Martens, Olson & Bear, LLP

(57) ABSTRACT

The present disclosure relates to a packaging material comprising a core material layer having an area radially extending from an edge of a hole in said core material layer, wherein said area has a linearly or non-linearly decreasing core material layer thickness towards the edge of the hole. The disclosure further relates to a method for production of such a packaging material, and uses thereof.

16 Claims, 4 Drawing Sheets

(51) Int. Cl.
  *B32B 15/085* (2006.01)
  *B32B 27/32* (2006.01)
  *B32B 15/20* (2006.01)
  *B32B 27/08* (2006.01)
  *B32B 7/12* (2006.01)
  *B32B 15/12* (2006.01)
  *B32B 38/04* (2006.01)
  *B31B 50/14* (2017.01)
  *B31B 50/84* (2017.01)

(52) U.S. Cl.
  CPC ... *B32B 2250/05* (2013.01); *B32B 2307/7244* (2013.01); *B32B 2307/732* (2013.01); *B32B 2439/40* (2013.01); *B32B 2439/70* (2013.01); *B32B 2553/00* (2013.01); *B65D 2231/02* (2013.01); *B65D 2231/022* (2013.01)

(56) References Cited

U.S. PATENT DOCUMENTS

| | | | | |
|---|---|---|---|---|
| 5,774,972 | A * | 7/1998 | Ehrlich | B21J 15/02 29/525.01 |
| 5,919,575 | A * | 7/1999 | Bowns, IV | A47B 96/206 428/537.5 |
| 6,036,803 | A | 3/2000 | Lasson et al. | |
| 2004/0163254 | A1 * | 8/2004 | Miyagawa | B21D 53/84 29/890.142 |
| 2017/0233158 | A1 | 8/2017 | Lyzenga et al. | |

OTHER PUBLICATIONS

Search Report and Written Opinion for International Application No. PCT/EP2017/052781 dated May 8, 2017 in 8 pages.

\* cited by examiner

PACKAGING MATERIAL, AND PROCESS OF MANUFACTURING THE SAME

TECHNICAL FIELD

The present invention relates to packaging materials and adaptation to cap or closure incorporation.

BACKGROUND

Product containers with caps or closures are well known. Upon production of packaging materials which later are folded into product containers, sensitive areas may arise where different components and/or layers of the packaging material interact.

Packaging materials may comprise different layers. As an example, a packaging material may comprise a paperboard with at least one decorative layer applied on one side thereof making up the outer surface of the packaging, and comprising a polymeric composition or layer on its other side, optionally a protective film e.g. being aluminium, and an inner layer being in contact with the product intended to be contained in the product container. If the product container is to be adapted for a cap or a closure, adjustments to the packaging material needs to be made. It is known that before application of any additional layers to the paperboard, the paperboard is adapted to the later application of a cap by incorporation of a hole for that purpose. Such cap and closure holes often display weaknesses or sensitive areas when applying subsequent layers e.g. due to adhesion problems between the additional layers at and around the location of the hole, Also, air entrapment in the form of air pockets may be generated during lamination of the packaging materials resulting in less than ideal adhesion between the material layers covering the hole. If a hole is made in the core material, air may be trapped upon application of film materials, such as lamination products, at the edges of the hole as the laminated material may not always follow the edges of the holes fully. A hole is normally punched in the core material by an orthogonal pusher at a right angle to the packaging material surface.

Poor layer adhesion is the root cause of many packaging defects but also limits productions speeds and may enforce use of excessive amounts of metal foils and polymer coatings.

It would be desirable to find new ways and products to allow for better interaction between the components of a packaging container in order to reduce defects stemming from their interaction.

There is a demand for new packaging materials and methods which are able to reduce the adhesion problem formed between different packaging material layers and components.

SUMMARY

The present invention relates to reducing the adhesion problem between different layers of the packaging material in connection with holes made in packaging materials, e.g. in connection with pre-laminated holes in packaging materials. Air pockets may be generated during lamination of pre-punched holes in the packaging materials. The air pockets may arise due to a strong discontinuity at the edges of a pre-punched hole.

When a substrate to be laminated has small holes it is also important to get good adhesion between layers of the laminate. If both the substrate thickness and the hole size are small and similar in size this becomes even more important.

The present invention provides a way to obtain a smoother thickness variation in at the edges of the holes. At and around the holes there is preferably an inclination on at least one side of the packaging material, meaning the thickness of the packaging material is steadily decreasing in an area around the hole. A reduced material thickness around the hole results in positive effects during lamination. The inclination at and around the hole may be performed by cutting and/or compression. Cutting and/or compression is preferably done on at least the side of the packaging intended to become the inside of the container. In addition the hole of the packaging material may be punched from the side of the packaging intended which will become the inside of the container towards the side of the packaging intended which will become the outside of the container.

The present invention provides advantages such as an improved adhesion between the layers of the packaging material, reduced risk of leakage and improved openability.

The present invention provides an overall improved package performance.

One object of the present invention is to provide a packaging material comprising a core material layer having an area radially extending from an edge of a hole in said core material layer, wherein said area has a linearly or non-linearly decreasing core material layer thickness towards the edge of the hole.

According to one embodiment the core material is plastic, paper, paperboard, or cardboard.

According to one embodiment the core material thickness at the edge of the hole is decreased at least 30%, preferably at least 50%, preferably between 50-95%.

According to one embodiment the area is radially extending at least 1 μm from the hole, preferably at least 2.5 μm, preferably at least 5 μm.

According to one embodiment the area of reduced core material thickness is provided on the side of the core material layer adapted to be part of the inside of a finished package.

According to one embodiment the area of reduced core material thickness is provided on both sides of the core material layer.

According to one embodiment the core material is provided with an outer layer comprising at least one polymer layer on one side of the core material layer; and/or provided with an inner layer comprising at least one polymer layer; and optionally a protective layer and/or a lamination layer; on the other side of the core material layer.

One object of the present invention is to provide a method of producing a packaging material according to the present invention, wherein the area of reduced core material thickness is obtained by compression and/or punching of the core material layer.

According to one embodiment the compression this performed before, simultaneously and/or after the hole is punched in the core material layer.

According to one embodiment the compression is higher at the edge of the hole and gradually and decreases in a linear or non-linear manner, in a radial manner from the edge of the hole.

According to one embodiment the hole punching is performed using an inclined puncher not being orthogonally positioned in relation to the core material.

According to one embodiment the hole punching is done on the side of the core material layer intended to become the inside of a finished packaging. The hole in the core layer is provided by punching from the side of the core material intended to become the inner side of a package to be produced towards the other side of the core material intended to become the outer side of a package.

According to one embodiment, the hole punching is performed using at least one punching tool at an angle to one surface of the core material layer of below 90°. The angle may be preferably up to 85°.

According to one embodiment, at least two punching tools are used to punch the hole of the core material layer and said punching tools have different punch directions to obtain inclinations on both sides of the core material layer.

According to one embodiment, the two punching tools form an angle to each other of 10-178°.

According to one embodiment, the inclined puncher includes a punching system having different punch directions to obtain inclinations on both sides of the core material. For example the punching system includes two in relation to each other orthogonally positioned punching parts.

According to one embodiment, the puncher is positioned in the machine direction (MD).

According to one embodiment, the core material is provided with an outer layer comprising at least one polymer layer on one side of the core material, and/or provided with an inner layer comprising at least one polymer layer and optionally a protective layer being a foil, on the other side of the core material.

According to one embodiment, the side of the core material onto which an additional layer is first being applied and which is treated to obtain a reduced core material thickness is the side of the core material intended to become the inner side of a package to be produced.

According to one embodiment, when the first layer or coating is applied, the core layer is contacted with a roller on the opposite side of the core layer being coated to allow stretching of the core material. When any subsequent layer is applied, the core layer with the first layer is contacted with a roller on the opposite side of the core layer being applied to allow stretching of the first layer and any additional subsequent layer(s).

One object of the present invention is to provide a packaging material obtainable by the present method.

One object of the present invention is to provide a package or container comprising the present packaging material.

One object of the present invention is using present packaging material or container/package for foods or drinks.

SHORT DESCRIPTION OF THE DRAWINGS

DETAILED DESCRIPTION

The packaging material according to the present invention comprises a core material layer, an outer layer, and an inner layer, wherein the outer layer and inner layers are applied to opposite sides of the core material layer. The outer layer applied to one side of the core material layer is adapted to provide the outer surface of a package to be produced, which outer surface and outer layer faces the surroundings of the package. The inner layer is applied to the other side of the core material layer and is adapted to provide the inner surface of a package to be produced which is in contact with the material contained in the package.

The core material may be a sheet, preferably made of plastic, paper, paperboard or cardboard.

The outer layer may comprise at least one layer of polymer material, which is applied to the core material layer. Moreover, one of the layers making up the outer layer may be a decorative layer making up the outer surface of the packaging to be formed.

A printing layer may be included onto the core material layer, adjacent to the outer layer.

The inner layer may comprise at least one layer of polymer material.

A protective layer may be present between the core material layer and the inner layer. The protective layer may be a foil, such as a metal foil, preferably an aluminium foil. The protective layer protects against oxygen and light to maintain the nutritional value and flavours of the food in the package at ambient temperatures.

In addition, a lamination layer may be present between the protective layer and the core material layer. The lamination layer may be at least one layer of polymer material.

According to one embodiment, the layers of the packaging material intended for the inside of a finished package, which is in contact with the material contained in the package comprises starting from the core material layer: a lamination layer, a protective layer and an sealing layer. The lamination layer enables the core material to stick to any protective layer applied. The sealing layer enables package sealing.

The polymer layers of the packaging material may be any type of polymer material, preferably a plastic material such as polyethylene.

Figure 1:
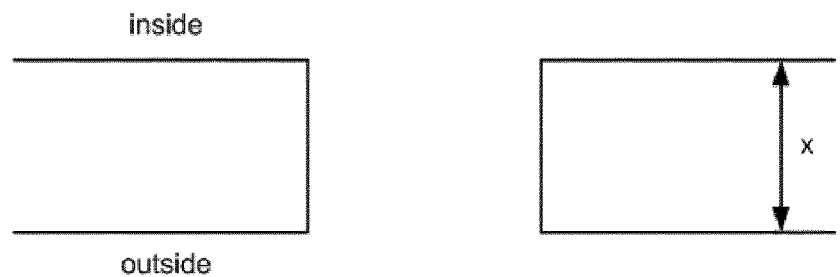
FIG. 1 shows a hole in a core material layer.
Figure 2:
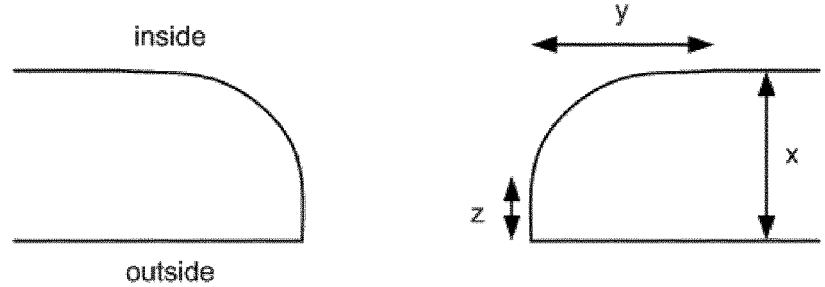
FIG. 2-4 show holes in a core material layer having areas of decreasing layer thickness towards the hole.
Figure 3:
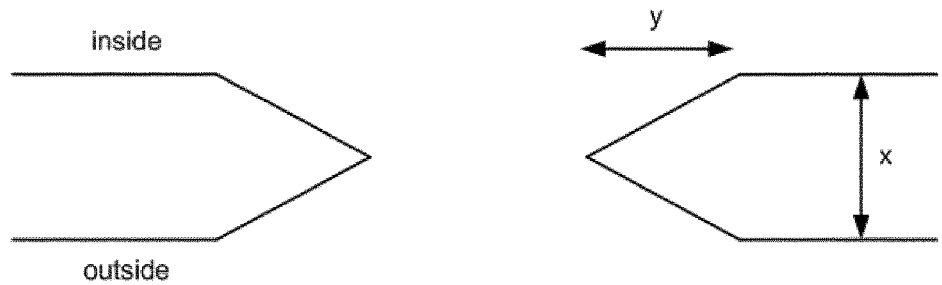
Figure 4:
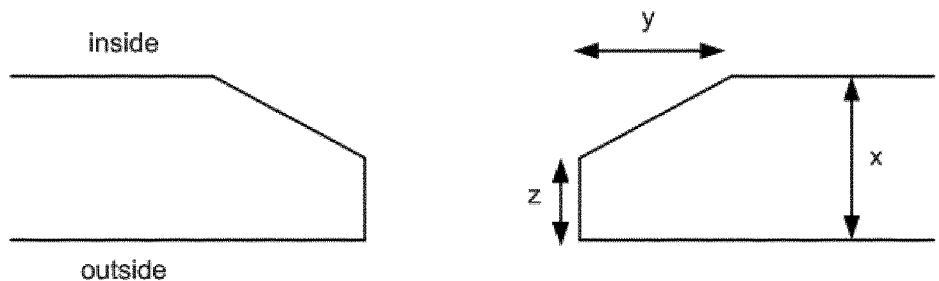

In order to be provided with a cap or closure the core material layer is provided with a hole, where the hole and its surroundings on the core material layer are preferably treated such that the cross section of the core material layer around the hole displays an inclined structure. The inclination is obtained as a gradual increase of the core material thickness starting from the hole edge towards the surroundings until full core material thickness has been obtained. The core material thickness may be influenced, i.e. decreased in view of the full core material thickness, on one or both sides of the core material. The full core material thickness may decrease towards the punched hole in a gradual manner, e.g. in a linear or non-linear manner. A non-linear decrease of the thickness may be an exponential decrease. In FIG. 1 a conventional orthogonically punched hole in the core material layer is shown. The core layer thickness is disclosed as x. In FIGS. 2-4 core materials having areas of decreasing core layer thickness in linear and non-linear manners are disclosed. The full core layer thickness is depicted as x in FIG. 1. The decreasing core layer thickness is shown as the radial distance y from the hole edge. Any remaining core layer thickness at the hole edge in an orthogonal manner is shown as z.

According to one embodiment the variation of the core material thickness at the inclined area may be 30-95%, of the core material thickness. Moreover, the core material thickness at the hole edge may be reduced at least a 30%, preferably at least a 50% compared to the full core material thickness. Viewed on a z-axis defined as being orthogonal to the plane in which the core layer surface is located, there is at least a 30% reduction of the core material thickness at the hole.

According to one embodiment the extent of the inclination from the edge of the hole, due to a reduced core material thickness, in a radial direction from the hole is at least 1 µm, at least 2.5 µm, at least 5 µm, at least 10 µm, at least 50 µm, at least 100 µm, or at least 200 µm from the hole. The extending area may be up to about 2 mm, such as up to about 1 mm, up to about 800 µm, up to 600 µm, up to 400 µm, up to 200 µm, or up to 100 µm. The upper and lower values may be combined to reasonable ranges. Viewed as a plane along x- and y-axes there is at least a 1 µm angled area surrounding the hole, at which area there is a reduced core material thickness. In FIGS. 2-4 and 11 the area with inclined structure is shown as y.

According to one embodiment the radially extending area with a reduced core material thickness is positioned on at least one side of the core material layer, preferably positioned on the side of the core material layer intended to become the inner side of a package. Alternatively, a radially extending area with a reduced core material thickness may be present on both sides of the core material layer, such as depicted in FIG. 3.

The inclination or reduced core material thickness may be obtained by compression and/or cutting of the core material layer.

Figure 7:
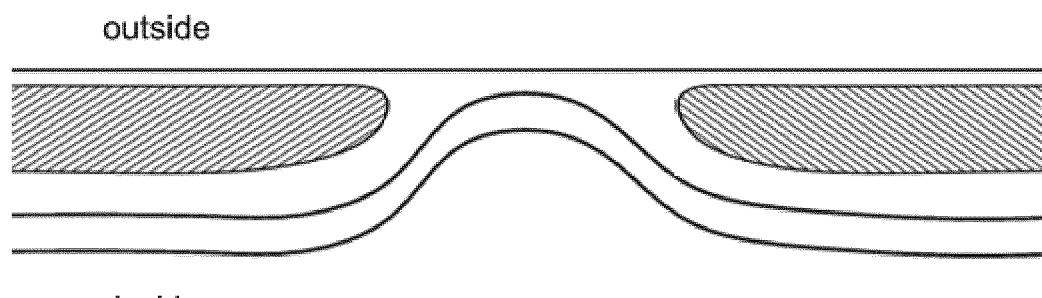
FIG. 7 shows a packaging material having a core material layer and applied layers thereon on both sides thereof.
Figure 8:
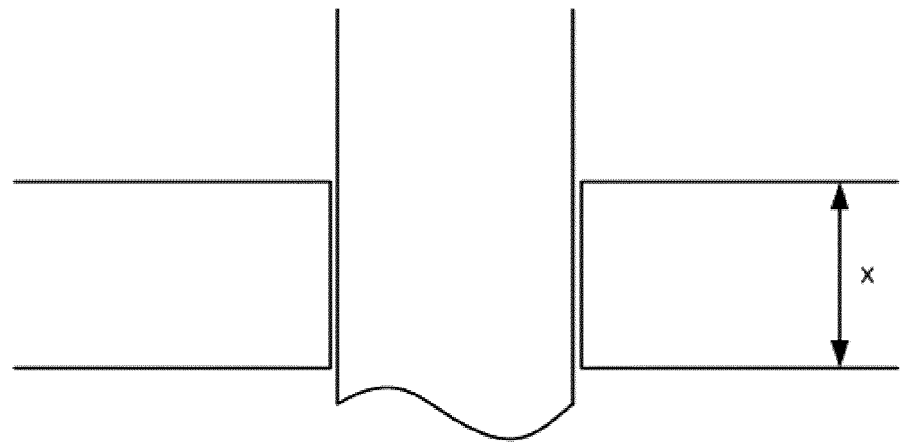
FIG. 8 shows a orthogonal punching tool making a hole in the core material layer in an othagonal manner.

If the inclination, or core material thickness reduction, is obtained by compression, this may be done at the same time as the hole is made, before and/or after hole making. If the hole is prepared by e.g. a orthogonal punching tool, a compression step may be applied before, at and/or after said hole punching. FIG. 8 discloses an orthogonal punching tool punching a hole in the core material layer. Upon hole punching, the edge and walls of the hole are orthogonal in relation to each other. By applying pressure to the hole edge and its surroundings the core material layer becomes compressed. Preferably the compression applied is larger at the direct edge of the hole and decreases gradually, e.g. in a linear or non-linear manner, in a radial direction away from the hole edge. Seeing the core layer in a cross section, such a compression results in a cone shaped formation around the hole on the side of the core material layer subjected to the compression. In one embodiment shown in FIG. 7, the compression is applied to the side of the core material layer intended to be facing the inside of a finished packaging.

Figure 10:
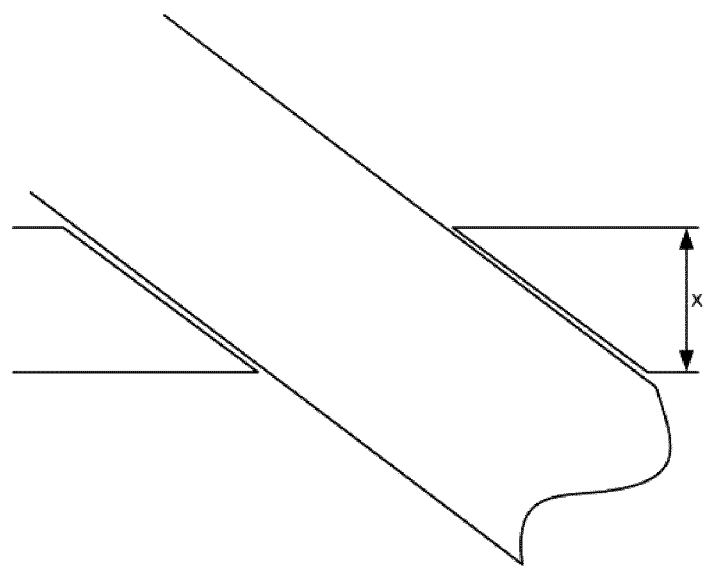
FIG. 10 shows a inclined punching tool making a hole in the core material layer in an inclined manner.

As an alternative or addition to compression, the hole may be made by an inclined punching tool, resulting in the core layer having an inclined cross-section extending radially outwards from the hole. This is shown in FIG. 10.

In one embodiment, the hole punching is done from the side of the core material layer intended to be facing the inside of a finished packaging.

A punching system may be provided having at least two punching tools. If at least two punching tools are used to punch a hole the punching tools may have different punch directions to obtain inclinations on both sides of the core material layer. The punching tools may be adapted to punch holes at an inclined angle (less than right-angled) in relation to a plane in which the core material layer is located. The two punching tools may be positioned opposite each other on the same side or the opposite side of the core material layer and the plane it forms. Preferably the smallest angle between each punching tool and the plane in which the core material layer is located is about the same for both punching tools. FIG. 10 discloses an inclined punching tool punching a hole in the core material layer. The two punching tools may be positioned orthogonal in relation to each other. The punching tool(s) may be positioned in any direction in relation to the machine, but a position in the machine direction is preferred to a position transversal to the machine direction, i.e. transversal to the transportation direction of the machine. A position in the machine direction of a punching tool means that the tool extends and retracts in the same direction as the direction of transportation of the core material through the packaging material production machine, i.e. along the transportation axis of the core material in the packaging material production machine. A position in the machine direction provides a smooth thickness variation of the core material layer. This means preparation of the hole at a different angle. It has been found that providing a hole in the core material layer which is at an angle below 90° improves layer adhesion during subsequent lamination process. A punching tool in this case is inclined and not orthogonal to the surface of the core material layer. The hole may be punched, such that the area of the core material layer around the edges of the hole is inclined at both sides of the core material layer. In one embodiment the hole preferably is made by punching the hole twice at an angle below 90° in relation to the surface of the core material layer, wherein the two punching tools parts are related to each other with an angle of 10-178°, such as 20-170°, 40-160° or 50-150°. If two inclined punching tools are used they may be positioned at at least a 90° angle in relation to each other. Thus, the hole cut in the core layer will affect both sides of the core layer, such that its cross section will display an inclination from both sides. The hole may be cut at an angle of 1-85° in relation to the surface of the core layer, such as 5-80°, 10-70° or 15-65°. According to one embodiment, the inclination from the edge of the hole, due to a reduced core material thickness, is provided radially extending from the hole edge at least 1 µm, preferably at least 2.5 µm, preferably at least 5 µm. In this type of hole cutting the area influenced with the inclination, i.e. the reduced core material thickness, may preferably be at least 100 µm, such as at least 200 µm from the hole. The extending area may be up to about 1 mm, such as up to about 800 µm.

Figure 5:
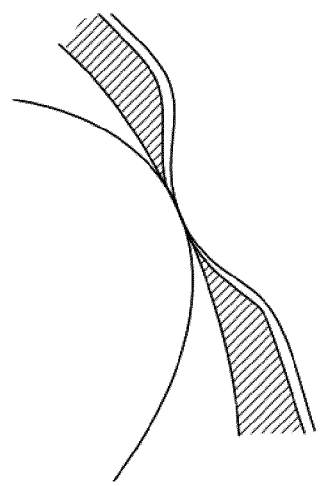
FIG. 5 shows a core material layer with applied layer thereon, which core material layer bears against a nip roller.

In one embodiment, the side of the core layer having the inclined thickness profile around the hole may be the side onto which subsequent layers are applied first. The use of an inclined core material layer thickness profile towards a premade hole helps any subsequent layers, e.g. laminate layer(s) and protective layers to smoothly attach to the hole edge. The improved attachment provides greater layer adhesion at the hole and hole edge of a finished packaging material. During and/or after application of laminate and/or protective layers, the opposite side of the core material layer may be contacted with a nip roller. FIG. 5 discloses contact between a nip roller and the core layer with applied layer(s). The nip roller may be of a larger dimension, i.e. having a larger diameter. The combination of inclination and contact with the curved surface of the nip roller will have the effect that the layers applied onto said side of the core layer will be able to better adhere to the core layer at the area with the inclined thickness profile area of the core material layer. As a result, a smoother layer combination is obtained and the adhesion between these layers around the area of the hole is improved.

Stretching of layers applied onto the core material layer may be done to provide a smooth attachment between the layers.

Figure 6:
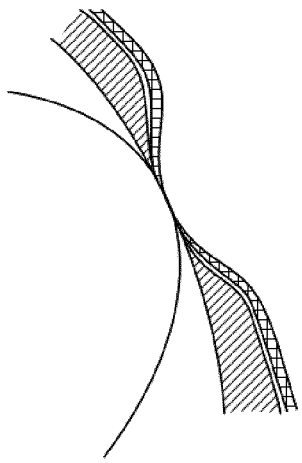
FIG. 6 shows a core material layer with applied layers thereon, which core material layer bears against a nip roller.

During the further production of the packaging material the core material including the lamination and protective layers may be provided with a sealing layer. It is preferred that the opposite side of the core material layer is contacted with a nip roller of a small dimension, i.e. a diameter smaller than the diameter of the previously used roller for application of lamination and protective layers. Here the small diameter nip roller stretches out the laminate and protective layers, and specifically the protective layer. During and/or after application of the sealing layer, the opposite side of the core material layer may be contacted with said nip roller. FIG. 6 discloses contact between a nip roller and the core layer with applied layers. As a result, a smoother layer combination is obtained and the adhesion between these layers around the area of the hole will be maximized.

The other side of the core layer intended for the outer part of a package being produced, may be coated before or after the layers on the inner side of the packaging material are applied. In FIG. 7 packaging material with a core layer with layers applied on both sides is shown.

Figure 9:
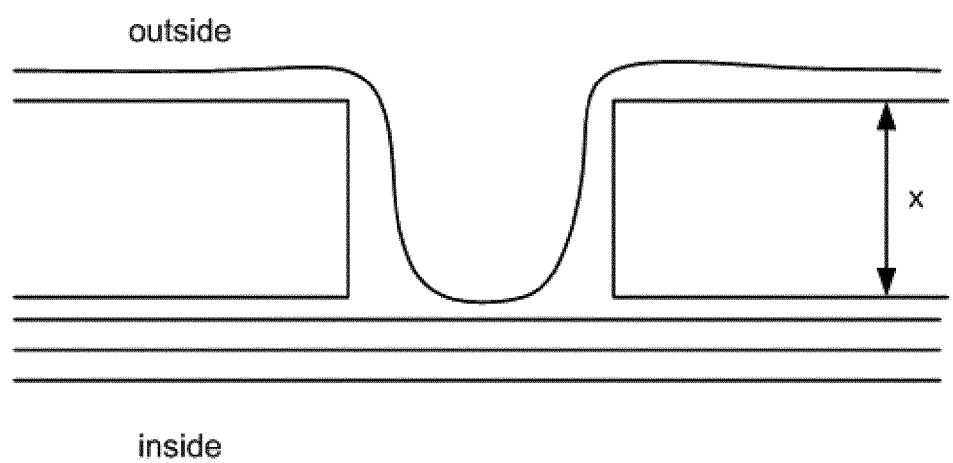
FIG. 9 shows a packaging material having a core material layer and applied layers thereon on both sides thereof.

FIG. 9 discloses a conventional packaging material with a hole made with a puncher orthogonal to the surface of the core layer. Such packaging materials may display adhesion problems between the layers, which is undesirable e.g. at the point of intersection between the hole edges, the outer layer and the first layer on the opposite side of the core layer.

FIG. 7 discloses an embodiment where the edge of the hole and the surrounding area have a decreasing core layer thickness, profile which results in improved layer adhesion at and around the hole compared to the embodiment in FIG. 9.

Figure 11:
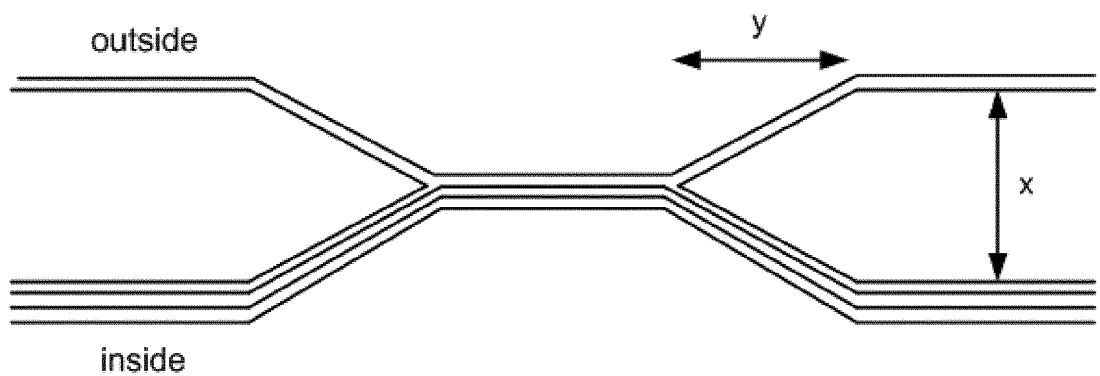
FIG. 11 shows a packaging material having a core material layer and applied layers thereon on both sides thereof.

FIG. 11 discloses another embodiment where the edge of the hole and the surrounding areas have a decreasing core layer thickness profile on both sides of the core layer, which results in an even further improved adhesion between the layers at and around the hole.

In the embodiment in FIG. 11 according to the present invention it is shown that the core material layer, e.g. paper board, may be coated with an outer layer, herein shown as the upper layer on top of the paperboard. On the other side of the core material layer, counting from the core material layer: a lamination layer, a protective layer and a sealing layer are shown.

A packaging material may be obtained by the present process. Different types of containers may be obtained from the packaging material according to the present invention. A packaging material or a container according to the present invention may be used for foodstuffs which preferably may be liquid.

The invention claimed is:

1. A packaging material comprising a core material layer, said core material layer having a first surface, a second surface opposite the first surface, a hole extending through the core material layer from the first surface to the second surface, and an area radially extending from an edge of the hole in said core material layer, wherein said area has a decreasing core material layer thickness profile towards the edge of the hole that is defined by a linear or non-linear taper along both of the first and second surfaces of the core material layer, wherein the core material layer is made from a material selected from the group consisting of paper, paperboard, and cardboard.

2. The packaging material according to claim 1, wherein a thickness at the edge of the hole of the core material layer is decreased in relation to a nominal thickness of the core material layer by a percentage selected from the group consisting of at least 30%, at least 50%, and between 50-95%.

3. The packaging material according to claim 1, wherein the area radially extends from the edge of the hole of the core material layer a distance selected from the group consisting of at least 1μm, at least 2.5 μm, and at least 5 μm.

4. The packaging material according to claim 1, further comprising:
   an outer layer comprising at least one polymer layer, said outer layer positioned adjacent the first surface of the core material layer; and
   an inner layer comprising at least one polymer layer, said inner layer positioned adjacent the second surface of the core material layer.

5. A method of producing the packaging material according to claim 1, wherein the area having said decreasing core material thickness profile is obtained by compression and/or punching of the core material layer.

6. The method according to claim 5, wherein the area having said decreasing core material thickness profile is obtained by both compression and punching of the core material layer.

7. The method according to claim 5, wherein the compression is higher at the edge of the hole and linearly or non-linearly decreases in a radial manner from the edge of the hole.

8. The method according to claim 5, wherein the punching is done at a side of the core material layer intended to become an inside of a finished package, said side comprising one of said first surface and said second surface of said core material layer.

9. The method according to claim 5, wherein the punching is performed using at least one punching tool at an angle with respect to one of the first or second surfaces of the core material layer, said angle being below 90°.

10. The method according to claim 5, wherein at least two punching tools are used to punch the hole of the core material layer and said at least two punching tools have different punch directions to obtain inclinations on both of the first and second surfaces of the core material layer.

11. The method according to claim 10, wherein the at least two punching tools are related to each other by an angle that is between 10-178°.

12. A container comprising the packaging material according to claim 1.

13. The packaging material according to claim 4, wherein the core material layer further comprises at least one of a protective layer and a sealing layer.

14. The method according to claim 5, wherein the punching is performed using at least one punching tool at an angle with respect to one of the first or second surfaces of the core material layer, said angle being at most 85°.

15. The method of claim 6, wherein said compression is performed simultaneously with said punching of the core material layer.

16. The method of claim 6, wherein said compression is performed before or after said punching of the core material layer.

* * * * *